May 11, 1954
E. S. CORNER
2,678,264
PRODUCTION OF INDUSTRIAL GASES CONTAINING
CARBON MONOXIDE AND HYDROGEN
Filed Aug. 12, 1947
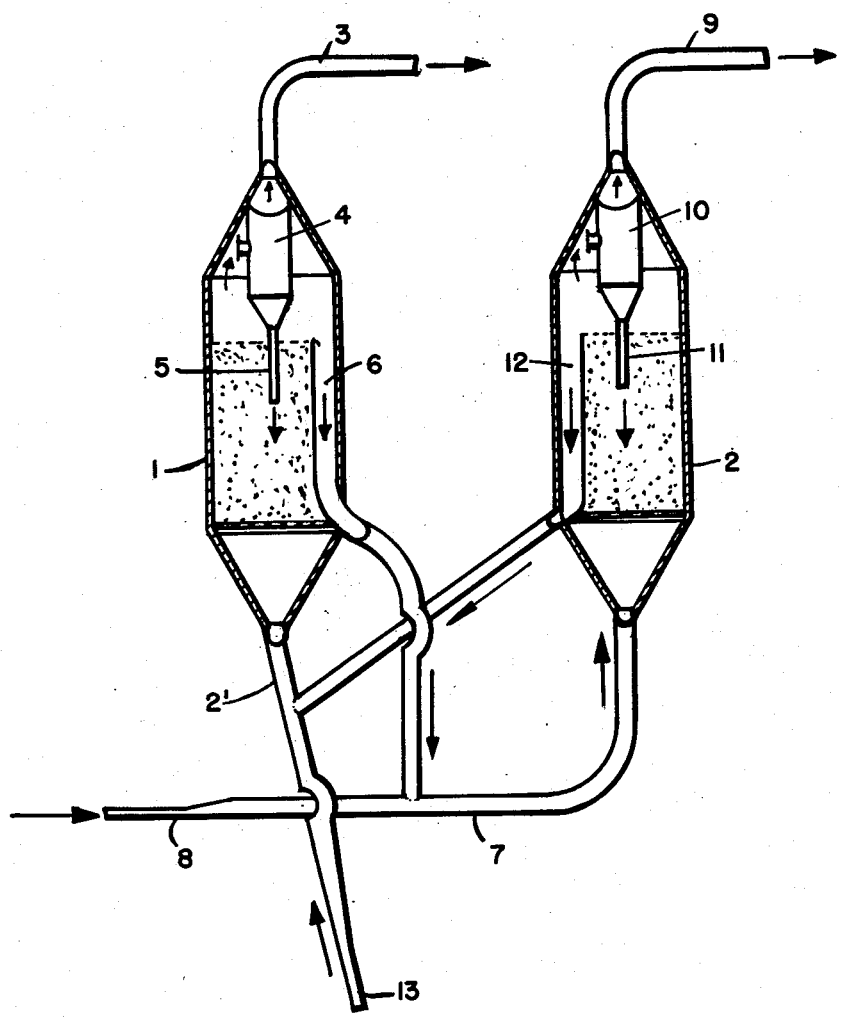
Eugene S. Corner Inventor
By P. J. Whelan Attorney Patented May 11, 1954

2,678,264

UNITED STATES PATENT OFFICE 2,678,264

PRODUCTION OF INDUSTRIAL GASES CONTAINING CARBON MONOXIDE AND HYDROGEN

Eugene S. Corner, Roselle, N. J., assignor to Standard Oil Development Company, a corporation of Delaware Application August 12, 1947, Serial No. 768,246

4 Claims. (Cl. 48—196)

The present invention is directed to a method for producing industrial gases containing carbon monoxide and hydrogen from gaseous hydrocarbons.

In many industrial processes the raw material is composed of, or essentially contains, a mixture of carbon monoxide and hydrogen. Chief among these processes are the so-called Methanol Synthesis in which carbon monoxide and hydrogen are reacted in the presence of a suitable catalyst to produce oxygenated organic compounds and the Fischer Tropsch Synthesis in which carbon monoxide and hydrogen in suitable proportions are reacted in the presence of a suitable catalyst and under selected conditions to produce a product primarily composed of liquid hydrocarbons. In processes of this type it is highly desirable that the feed gas be free from contamination with inert gaseous substances.

The obvious way to obtain a mixture of carbon monoxide and hydrogen is to subject a mixture of a hydrocarbon, such as methane, and air to controlled combustion. This procedure, however, results in a gas containing a large quantity of nitrogen. This detrimental dilution has led to much study and experimentation directed toward the development of a method for producing the desired "make gas" free from contaminants and diluents.

Among the procedures which have been proposed for producing from hydrocarbons a suitable gas mixture containing carbon monoxide and hydrogen free from large volumes of diluent gas is that in which a metal is used as an oxygen carrier. The general procedure proposed is to react the hydrocarbon, such as methane, with a metal oxide until the latter is depleted in oxygen content, then to reoxidize the depleted metal carrier with air, venting off the residue gases and again reacting the regenerated oxide with the hydrocarbon. By this procedure the gas resulting from the reaction of the hydrocarbon with the metal oxide is obtained separately from the gaseous residues from the oxidation of the metal with air.

While a number of metals have been proposed for use in this process they all present different problems when it is attempted actually to use them in the process. Zinc oxide is one which theoretically should serve the purpose admirably because its oxidation potential is such that it is practically impossible to oxidize a hydrocarbon with zinc oxide to carbon dioxide whereby a high selectivity to carbon monoxide can be expected in the use of this metal oxide. Zinc oxide, however, presents the great difficulty that at the temperature at which it will give up its oxygen the zinc will also vaporize, giving rise to a difficult recovery problem.

Of the many oxides which might be considered useful, iron oxide, based on considerations of availability, price and reactivity with hydrocarbons, would seem to be the logical choice. When it is attempted, however, to react a hydrocarbon such as methane with a fixed bed of iron oxide, the course of the reaction proceeds in a direction quite the contrary of that desired. At the outset the iron oxide oxidizes the hydrocarbon completely to carbon dioxide until an appreciable quantity of free iron is present in the reaction mass. From that point on some carbon monoxide is produced but at the same time large quantities of carbon are produced by reason of the highly catalytic effect of the iron on the cracking of hydrocarbons.

It had been expected that this difficulty of controlling the course of the reaction between the hydrocarbons and iron oxide could be ameliorated by operating according to that technique which has come to be known as a fluidized solid technique in which the solid in finely divided form is suspended in a rising stream of the gas to be reacted while correlating the velocity of the gas with respect to the degree of fineness of the solid to produce a dense suspension of the solid in the gas in which the solid is in a highly turbulent state. The difficulty encountered with this procedure, however, is that when the temperature of operation is maintained within the limits calculated to give the desired rate of reaction, for example, between about 1600 and 2000° F., the finely divided mixture of iron oxide and iron proves to be very difficult to fluidize. It appears that the powdered material becomes sticky in this range of temperatures, although it is considerably below the melting point of either the iron oxide or the iron, with the result that the particles agglomerate and do not remain in the desired state of suspension. This failure to remain fluidized appears to cause the reaction to follow substantially the same course as that observed in fixed bed operation.

According to the present invention, the reaction between a gaseous hydrocarbon and finely divided iron oxide by the fluidized solid technique is made possible by employing the iron in conjunction with magnesia. It has been observed that the mere mechanical mixing of magnesia with iron oxide does not lead to the desired result and, in fact improves only in a minor degree the fluidizing characteristics of the iron oxide. It has been discovered, however, that if the iron oxide is deposited on the magnesia either by coprecipitation of the magnesia and iron oxide from mixed solutions of their salts or by impregnation of magnesia with a solution of an iron salt, followed by roasting, the resulting mixture lends itself readily to fluidization and makes possible reaction with a gaseous hydrocarbon with substantial conversion and selectivity to carbon monoxide without any substantial production of carbon.

In the practice of the present invention it has been found that the mixture of magnesia and iron oxide should not contain substantially in excess of 25% iron oxide, as $Fe_2O_3$. Increasing the quantity of iron oxide above this limit reduces the fluidizability of the solid and gives rise to a tendency toward carbon production. In general, the mixture will contain from about 10 to about 20% by weight of iron oxide as $Fe_2O_3$.

Studies of other oxides as fluidizing agents for the iron oxide reveal that very few are suitable. Alumina, for example, which is commonly considered an equivalent of magnesia as a carrier, influences the reaction toward the production of carbon and carbon dioxide. Thoria also gave rise to high carbon formation. Other oxides such as vanadium oxide melt at too low a temperature.

It has been found, however, that when magnesia is employed the quantity of iron oxide which may be used with it may be increased by the simultaneous addition of chromium oxide. By including chromium oxide in amounts ranging between about 5 to 20% the iron oxide can be increased to the neighborhood of 50%. The maximum limits, for example, include a composition containing about 20% chromia, 30% magnesia and 50% iron oxide. In this three-component mixture it is preferred to maintain the iron oxide in the range of about 15 to 35% and the magnesia from about 45 to 70.

The operating temperature in the practice of the present invention will in general be above 1600° F. and may approach 2000° F., but will not ordinarily exceed about 1850° F. The finely divided solid, preferably, contains particles none of which is substantially larger than 10 mesh and the bulk of which is smaller than about 100 mesh. It will be understood that this powdered material will include particles of various sizes ranging upwardly from about 5 microns and containing a substantial fraction between about 200 and 400 mesh. With solids in the foregoing particle size range suitable fluidization is realized by flowing the gas upwardly through the finely divided solids at a velocity ranging from about .3 to 5 ft. per second. It will be understood that lower gas velocities may be employed, in which case the action may be more properly described as jiggling than fluidization. Any type of mixing in which there is movement of the solid particles in the gas in such a way as to maintain a substantially homogeneous composition of solids throughout the reaction zone in the form of a dense suspension containing upwards of 5% by volume of solids is satisfactory for the practice of the present invention.

In the accompanying drawing is shown in diagrammatic form a front elevation of an apparatus suitable for the practice of the present invention.

Referring to the drawing in detail, numeral 1 designates a reaction vessel and numeral 2 designates a regeneration vessel. In the embodiment shown these vessels operate on the dense phase drawoff principle. It will be understood that these vessels can be of the well known bottom drawoff type or the strictly upflow type.

Vessel 1 is provided at its bottom with an inlet 2' for gas and finely divided solid and at its upper end with an outlet 3 for gas ahead of which is an internal cyclone 4 or other separator for gases and solids having a dip leg 5 depending into the vessel. On one wall the vessel is provided with a duct 6 having its open upper end terminating at the selected level for the dense phase of the suspension. This duct empties into a line 7 into which air or other oxidizing gas is fed through line 8. Line 7 discharges into the bottom of vessel 2 which, like vessel 1, is provided at its upper end with a gas vent 9 ahead of which is arranged a cyclone separator 10 having a dip leg 11 extending into the dense phase of the suspension in vessel 2. Vessel 2 is also provided with a duct 12 on one of its walls having its open upper end located at the intended level of the dense phase of the suspension in vessel 2. Duct 12 empties into line 2' into which is fed a hydrocarbon gas through line 13.

In carrying out the process of the present invention in the apparatus described, the vessels are charged with finely divided solid the individual particles of which are composed of magnesia thoroughly impregnated with iron oxide. As previously indicated, this mixture is conveniently prepared by mixing aqueous solutions of a magnesium salt and an iron salt and coprecipitating the hydroxides with an alkali. The precipitate is carefully washed to remove water-soluble contaminants after which it is dried and roasted. If the final product is not in the finely divided form heretofore specified, it is ground so as to satisfy the requirements.

In starting up with both vessels charged with the finely divided solid mentioned above, the system may be brought to a temperature between about 1550 and 1850° F. by feeding hot combustion gases through lines 8 and 13. If desired, some finely divided carbon may be mixed with the initial charge and the system brought to temperature by burning off the carbon. When the operating temperature is attained, a hydrocarbon gas is fed through line 13 at a velocity such as to maintain the finely divided solid in vessel 1 in suspension in the gas in the form of a dense body in which the particles are in incessant motion. The velocity should be so regulated as to produce a suspension having at least about 5% by volume of solids, preferably between about 10 and 25%. The velocity is correlated with the amount of solids charged so as to bring the level of the dense phase to a point where it overflows into conduit 6. The gases passing out of the vessel tend to carry solids with them. These solids are separated in the cyclone 4 and returned to the dense suspension.

As the solid overflows into conduit 6 and thus into line 7, preheated air or other oxidizing medium is fed in through line 8 at a velocity such as to carry the finely divided solid into vessel 2 and maintain it therein in a suspension of the character heretofore described, the level of the dense phase of the suspension being so regulated that the dense phase overflows into conduit 12 which carries solid back into line 2'.

The heat required for the reaction in vessel 1 is supplied primarily as sensible heat contained in the solids returned from vessel 2 supplemented by preheat imparted to the hydrocarbon gas from the hot exhaust gas from vessel 2.

It will be appreciated that the illustration of the apparatus and the drawing is limited to the bare essentials, calculated merely to depict the flow plan of the process. Design and engineering details are purposely omitted to avoid unnecessary complication. Among such details are heat exchangers, aerating jets for the various conduits, pumps, and the like. It is repeated that the flow plan shown is only one of several which may be used, the essential requirement being that the flow plan shall include at least two zones in one of which hydrocarbon is reacted with iron oxide and in the other of which iron with depleted oxygen content is treated with an oxidizing gas so as to replenish its oxygen content.

In order to illustrate the improved results obtainable by the practice of the present invention, reference is made to the following table of data in which are tabulated the results obtained in a ceramic reactor at 1700° F. with 20 $Fe_2O_3$–80 MgO prepared by coprecipitation of the respective sulphates. The table gives the operating conditions. Satisfactory fluidization was realized in this operation which resulted in a conversion as high as 57% with a selectivity to CO of 87% and no carbon. The hydrogen to CO ratio in the product gas was 1.9, which is a satisfactory composition for use in the Fischer Tropsch Synthesis. The fact that the gas contains some $CO_2$ is not detrimental since in the Fischer Synthesis $CO_2$ contained in the feed gas undergoes reaction with water in the reactor yielding further quantities of CO which influences the effective hydrogen to CO ratio in a favorable direction.

*Methane oxidation with 20 $Fe_2O_3$–80 MgO 1700° F.*

| Type of Operation | Fluid | | Fixed Bed |
|---|---|---|---|
| Cycle No | 1 | 3 | 1 |
| Feed Rate, V./V./Hr | 200 | 200 | 100 |
| Methane Conversion, Percent | 57 | 44 | 93 |
| Selectivity, Mol Percent: | | | |
| CO | 87 | 88 | 82 |
| $CO_2$ | 13 | 12 | 18 |
| C | 0 | 0 | 0 |
| $H_2$/CO Mol Ratio | 1.9 | 1.9 | |

It may be pointed out that with all oxygen carriers of the metal oxide type, with the possible exception of zinc oxide, there is an induction period in which the oxidation goes beyond CO formation to the formation of $CO_2$. This is evidently because the oxidation potential of the metal oxide in its most highly oxidized form is too high to avoid complete oxidation of the hydrocarbon. This is illustrated by the following data obtained in a fluidized operation in a ceramic reactor:

| Cycle Number | 1 | | |
|---|---|---|---|
| Feed Rate, V./V./Hour | 3 | 8 | 20 |
| Time on Stream, Min | | | |
| Methane Conversion, Percent | 96.5 | 91.0 | 57.4 |
| Selectivity, Mol Percent: | | | |
| CO | 0 | 3 | 87 |
| $CO_2$ | 100 | 97 | 13 |
| C | 0 | 0 | 0 |
| $H_2$/CO Mol Ratio | 2.0 | 1.2 | 1.9 |
| Product Distribution, Mol Percent: | | | |
| $CO_2$ | 32.8 | 31.3 | 3.6 |
| $H_2O$ | 65.6 | 63.3 | 10.6 |
| $H_2$ | 0.2 | 1.2 | 42.9 |
| CO | 0.1 | 1.0 | 23.1 |
| $CH_4$ | 1.2 | 3.2 | 19.8 |
| Unsaturates | 0.1 | 0.0 | 0.0 |
| C | 0.0 | 0.0 | 0.0 |

It will be observed from this data that the unit was in operation for about 20 minutes before high selectivity to carbon monoxide was obtained. In a continuous operation, according to the present invention, when this stable condition is reached, it is maintained by controlling the regeneration of the oxide. This is done by controlling the amount of air or other oxidizing gas fed to the regenerator or by controlling the residence time of the solid in the regenerator. The operator can determine the adequacy of his regenerating conditions by watching the composition of the "make gas." If the content of CO tends to decrease he knows that he has to cut down the degree of oxidation in the regenerator by either or both of the expedients mentioned above.

The data given above shows that in the operations in question no carbon formation was encountered. It is known, however, that, if the metal oxide is maintained in the reactor for too long a time, carbon will tend to form even with the solid mixture specified herein. Carbon formation is another factor which must be controlled in a continuous operation. The appearance of carbon indicates either too long a residence time of the oxide in the reactor or too low a degree of oxidation in the regenerator. Thus, while the operator must be careful not to get too high a degree of oxidation in the regenerator in order to hold down the production of carbon dioxide, he must also avoid under oxidation in the regenerator or too long a residence time of the oxide in the reactor in order to minimize carbon formation.

Data on the use of iron oxide alone in fluidized operation for comparison with the data given above for the mixture of iron oxide and magnesia was not obtained because of difficulty encountered in the fluidization of the iron oxide. To demonstrate, however, the unexpected effect of the magnesia the following comparative data are given:

| | MgO | $Fe_2O_3$ | 80 MgO–20 $Fe_2O_3$ |
|---|---|---|---|
| Methane Conversion, Percent | 21 | 56 | 93 |
| Selectivity, Mol Percent: | | | |
| CO | 39 | 23 | 82 |
| $CO_2$ | 3 | 77 | 18 |
| C | 58 | 0 | 0 |

These data were obtained from fixed bed operations in a quartz reactor at a temperature of 1700° F. and with a feed rate of methane of 100 v./v./hr. In one operation the contact mass was MgO, in another $Fe_2O_3$ and in the third 80 MgO–20 $Fe_2O_3$. These data are not strictly comparable because the time periods in the three runs were not exactly the same. The data selected, however, are the best obtainable with the three contact materials. In the case of the iron oxide, for example, an extension of the operating period beyond that at which the data given were obtained resulted in excessive formation of carbon with no improvement in CO selectivity. For example, when the time was doubled, the selectivity to carbon went to 52% while the selectivity to CO was 22%.

The above data demonstrate that while magnesia itself is relatively ineffective, giving a low conversion with a low selectivity to CO and high carbon formation, and while $Fe_2O_3$ gives substantially higher conversion with, however, a low selectivity to CO, the mixture of MgO and $Fe_2O_3$ gives a very high conversion with a high selectivity to CO with no carbon formation.

Although in the foregoing the specific operation described employs the fluidized solids technique, it is to be understood that in the practice of the present invention a fixed bed or a combination of fixed bed and a fluidized solid bed may be employed. In general, the temperature in the hydrocarbon oxidation zone is maintained in the range between about 1600° and 2000° F. The actual upper limit of the temperature may be above 2000° F. and is dictated only by the melting point of the finely divided solid or the material of which the reaction vessel is constructed. The pressure may be atmospheric or superatmospheric, depending on design and economic considerations. Pressures as high as 600 lbs./sq. in. are contemplated. The feed rate of the hydrocarbon gas may vary widely depending on other operating conditions. In general, permissible feed rates will be higher the higher the operating temperature and pressure. Feed rates as low as 100 volumes of gas per volume of oxygen carrier per hour are contemplated and this feed rate may be as high as 3000 v./v./hr. The residence time of the oxygen carrier in the hydrocarbon oxidation zone will vary and is a function of the circulation rates required for temperature control between the reactor and the regenerator. This residence time is also a function of the average oxygen to metal ratio in the oxygen carrier at which high selectivities for CO production are obtained. This residence time may vary from about 5 to 30 minutes. In general, it is preferred to have a residence time of the oxygen carrier in the hydrocarbon oxidation zone in the range of about 10 to 15 minutes.

The nature and objects of the present invention having been described and illustrated, what is claimed as new and useful and is desired to be secured by Letters Patent is:

1. In a process in which interconnected beds of a fluidized finely divided oxygen carrier are maintained by passing upwardly through one of said beds a gas consisting essentially of gaseous hydrocarbon, at a velocity sufficient to maintain said bed in a fluidized state, at a temperature between about 1600° and 2000° F. and by passing upwardly through the other of said beds an oxidizing gas at a velocity sufficient to maintain said bed in a fluidized state and at a temperature at which oxygen is added to said carrier and by continuously circulating finely divided oxygen carrier from each bed to the other and a gas containing carbon monoxide and hydrogen is recovered from said first mentioned bed, the step of using as an oxygen carrier a composition consisting essentially of magnesia, from about 10 to about 50% by weight iron oxide as $Fe_2O_3$, and from 0 to about 20% by weight chromium oxide and comprising no more than about 25% by weight iron oxide as $Fe_2O_3$ when 0 to about 5% by weight chromium oxide is present in which the magnesia and the iron oxide are thoroughly intermixed to the extent afforded by mixing in an aqueous medium an iron salt and a magnesium salt, coprecipitating magnesia and iron oxide, separating the said precipitate from the aqueous medium, drying and roasting.

2. A method for converting a gaseous hydrocarbon into a gas containing hydrogen and carbon monoxide which consists essentially of passing said hydrocarbon upwardly through a contacting zone containing finely divided particles consisting essentially of magnesia, from about 10 to about 50% by weight iron oxide as $Fe_2O_3$, and from 0 to about 20% by weight chromium oxide and comprising no more than about 25% by weight iron oxide as $Fe_2O_3$ when 0 to about 5% by weight chromium oxide is present, said particles having an intimacy of admixture of magnesia and iron oxide equal to that obtainable by coprecipitation of the hydroxides of magnesium and iron from mixed solutions of salts of magnesium and iron followed by heating, maintaining the temperature in said zone between about 1600° and 2000° F., regulating the velocity of flow of said gaseous hydrocarbon in said zone so as to maintain said finely divided particles in suspension therein in the form of a dense fluidized mass, and recovering product gas containing hydrogen and carbon monoxide from said zone.

3. A process according to claim 2 in which the oxygen carrier is employed in the form of fine particles, none of which is substantially larger than 10 mesh, the bulk of which are smaller than about 100 mesh and a substantial fraction of which is between about 200 and 400 mesh.

4. A process according to claim 2 in which the oxygen carrier is a three-component mixture containing between 45 and 70% magnesia, between 15 and 35% iron oxide and between about 15 and 20% chromium oxide.

References Cited in the file of this patent

UNITED STATES PATENTS

| Number | Name | Date |
|---|---|---|
| 1,899,184 | De Simo | Feb. 28, 1933 |
| 2,042,285 | Wilke et al. | May 26, 1936 |
| 2,395,875 | Kearby | Mar. 5, 1946 |
| 2,425,754 | Murphree et al. | Aug. 19, 1947 |
| 2,426,829 | Kearby | Sept. 2, 1947 |
| 2,513,994 | Davidson | July 4, 1950 |
| 2,550,742 | Welty | May 1, 1951 |
| 2,607,669 | Corner et al. | Aug. 19, 1952 |